United States Patent [19]

Ruoff

[11] 4,131,176

[45] Dec. 26, 1978

[54] HYDRAULIC STEERING ARRANGEMENT

[75] Inventor: Manfred Ruoff, Stuttgart, Fed. Rep. of Germany

[73] Assignee: Robert Bosch GmbH, Stuttgart, Fed. Rep. of Germany

[21] Appl. No.: 848,086

[22] Filed: Nov. 3, 1977

[30] Foreign Application Priority Data

Nov. 20, 1976 [DE] Fed. Rep. of Germany ....... 2652815

[51] Int. Cl.$^2$ ............................................. B62D 5/10
[52] U.S. Cl. ..................................... 180/131; 180/142
[58] Field of Search ................ 180/133, 79, 141, 142; 104/244.1; 172/26

[56] References Cited

U.S. PATENT DOCUMENTS

| 2,918,135 | 12/1959 | Wittren | 180/133 |
| 3,280,557 | 10/1966 | Sattavara | 180/133 |
| 3,343,501 | 9/1967 | Banderet | 104/244.1 |
| 3,434,282 | 3/1969 | Shelhart | 180/133 |
| 3,765,501 | 10/1973 | Burvee | 104/244.1 |

Primary Examiner—Joseph F. Peters, Jr.
Assistant Examiner—R. Schrecengost
Attorney, Agent, or Firm—Michael J. Striker

[57] ABSTRACT

A hydraulic steering arrangement for the wheels of a motor operated vehicle comprises a first manually controlled servo steering mechanism operatively connected to the wheels of the vehicle, a second automatically controlled steering mechanism also operatively connected to the wheels for steering the vehicle along a predetermined path and means for selectively connecting either of the steering mechanisms to a source of pressure fluid.

12 Claims, 1 Drawing Figure

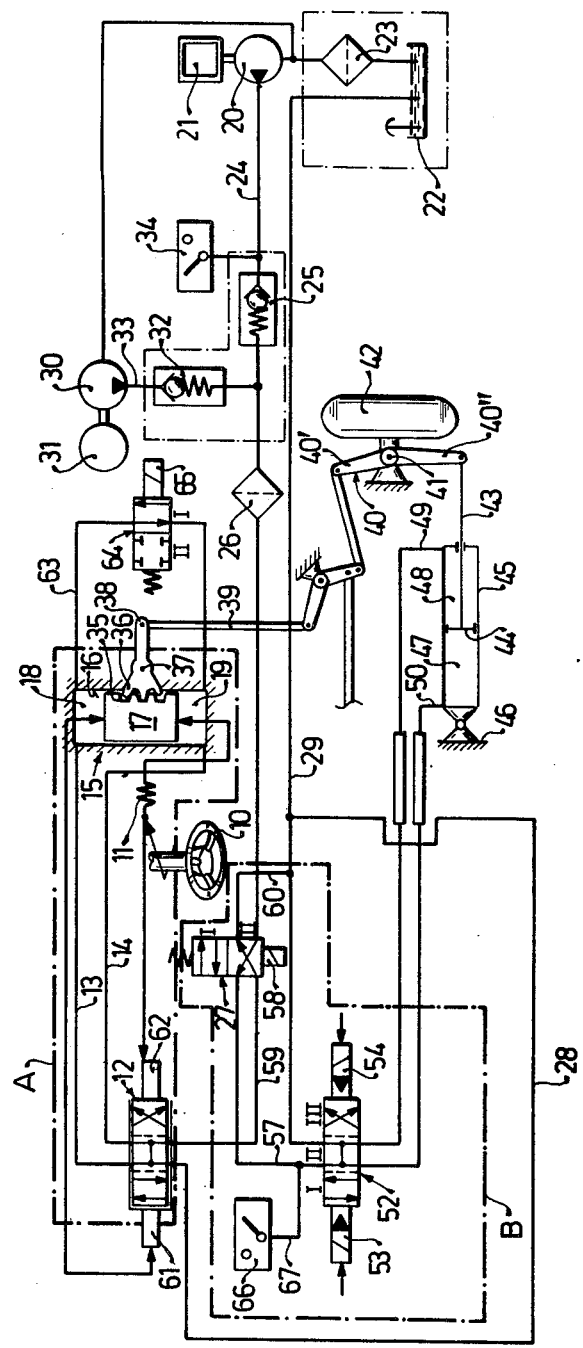

HYDRAULIC STEERING ARRANGEMENT

BACKGROUND OF THE INVENTION

The present invention relates to a hydraulic steering arrangement for the wheels of a motor operated vehicle. Hydraulic steering arrangements for this purpose are known in the art, in which a hydraulically operated servo mechanism serves only to facilitate and support operation of a manually controlled steering mechanism and in which the servo mechanism forms with the manually controlled mechanism a closed system solely for the above-mentioned purpose.

SUMMARY OF THE INVENTION

It is an object of the present invention to provide a hydraulic steering arrangement which may either be manually controlled for steering the vehicle along a path selectable by the operator or for automatically steering the vehicle along a predetermined path.

With these and other objects in view, which will become apparent as the description proceeds, the hydraulic steering arrangement according to the present invention for the wheels of a vehicle to be manually or automatically controlled, may comprise linkage means connected to the wheels of the vehicle, a source of pressure fluid, manually operable means comprising a first multiple position valve adapted to be connected in circuit with the source of pressure fluid, in which the first multiple position value is movable between a neutral position and two working positions, hydraulically operated servo means in circuit with the first multiple position valve and mechanically connected to the linkage means for controlling the position of the latter, and a manually operable steering wheel connected to the first multiple position valve for moving the same between said positions thereof to thereby control movement of the servo means. The arrangement includes further automatically operable means comprising a second multiple position valve adapted to be connected in circuit with the source of pressure fluid, in which the second multiple position valve is movable between a neutral position and two working positions, hydraulically operated cylinder and piston means in circuit with the second multiple position valve and also mechanically connected to the linkage means, and a reversing valve connected upstream of the first and second multiple position valves to the source of pressure fluid and movable between a first position connecting the first multiple position valve to the source of pressure fluid and a second position connecting the second multiple position valve to the source.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

The single FIGURE of the drawing schematically illustrates the hydraulic steering arrangement according to the present invention.

DESCRIPTION OF THE PREFERRED EMBODIMENT

Referring now to the drawing, it will be seen that the hydraulic steering arrangement according to the present invention may comprise manually operable means which may be enclosed in a box A, schematically illustrated by a dash-dotted line, and including a manually operable steering wheel 10 projecting from the box and operable against the force of a torsion spring 11. A four-part, three-position valve 12 is connected, by known means not illustrated in the drawing, to the steering wheel 10 to be movable from a neutral position to two operating positions on opposite sides of the neutral position. Two adjacent ports on one side of the valve 12 are connected by conduits 13 and 14 to a hydraulically operated servo device 15. The servo device 15 comprises a cylinder 16 closed at opposite ends and a piston 17 axially movable in the cylinder 16 and defining between opposite ends of the piston 17 and the closed opposite ends of the cylinder 16 a pair of pressure chambers 18 and 19, to which pressure fluid may be fed through the conduits 13 and 14, respectively.

The necessary pressure fluid for operating the servo mechanism 15 is provided by a pump 20 which is operated by the motor 21 of the vehicle. The pump 20 sucks fluid from a tank 22 over a filter 23 and pumps the fluid under pressure into a feed conduit 24, which, over a one-way valve 25 and a filter 26, leads to a reversing valve 27 and from the latter to the multiple position valve 12. From the multiple position valve 12 leads a conduit 28 to a return conduit 29, which communicates with the tank 22.

The arrangement includes further an auxiliary pump 30 driven by an electromotor 31. The pump 30 is connected over a one-way valve 32 to the feed conduit 24. The one-way valve 32 is arranged to permit flow of pressure fluid from the auxiliary pump 30 to the feed conduit 24, while preventing flow of fluid in the opposite direction. The auxiliary pump 30 is connected to a conduit leading from the tank 22 to the pump 20 and this connection is made between the pump 20 and the filter 23. The motor 31 driving the auxiliary pump 30 can be actuated by means of a hydraulic pressure switch 34 connected by a conduit to the feed conduit 24 and by non-illustrated conductors to the electromotors 31, to actuate the latter if the pressure in the feed conduit 24 drops below a predetermined pressure.

The piston 17 of the servo mechanism 15 is provided on one side of its peripheral surface with a rack 35, extending in the axial direction of the piston 17, and meshing with the teeth of a gear segment 36 carried at one end of a two-armed lever, tiltable about a fixed axis 37. The other end 38 of the two-armed lever is pivotally connected to one end of linkage means 39, the other end of which is connected to a two-armed lever 40, which is tiltable intermediate its ends about a fixed axis 41 and connected to a wheel 42 of the vehicle to tilt the wheel 42 depending on the tilting of the lever 40 about its tilting axis 41.

The lever arm 40" of the lever 40 is pivotally connected to one end of a piston rod 43, the other end of which is connected to a piston 44 slidably guided in a working cylinder 45, which, in turn, is pivotally connected at one end thereof to the frame 46 of the vehicle. The piston 44 defines in the working cylinder 45 two pressure chambers 47 and 48 to opposite sides of the piston 44 and conduits 49 and 50 respectively communicate with the pressure chambers 47, 48. The working cylinder 45 forms, together with the piston 44 axially movable therein, part of automatically operable means for controlling the position of the wheel 42. The automatically operable means include further a plurality of valves which may be housed in a box B schematically illustrated by a further dash-dotted line in the drawing. These valves include an electromagnetically operable proportional valve 52, which is likewise constructed as a three-position, four-port valve and which is movable from a neutral position II to a pair of working positions I and III located to opposite sides of the neutral position. The valve 52 is movable between the positions thereof by a pair of electromagnetis 53 and 54 connected to opposite ends of the valve. The valve 52 has on one side two ports respectively connected to the conduits 49 and 50 and on the other side two additional ports, one of which is connected to the return conduit 29 leading to the tank 22, whereas the other port is connected to a conduit 57 leading to the reversing valve 27. The reversing valve 27 is constructed as a two-position, four-port valve and movable between the positions I and II by an electromagnet 58. A conduit 59 leads from the two-position valve 27 to the multiple position valve 12. A further conduit 60 leads from the reversing valve 27 to the return conduit 29. The multiple position valve 12 is operable in a known manner by the torsion spring 11, respectively by the steering wheel 10. The two pressure chambers 18 and 19 to opposite sides of the piston 17 are connected by a conduit 63 with each other, in which a bypass valve 64 is arranged, which is movable between a throughflow position I in which pressure fluid may flow between the pressure chambers 18 and 19 and a closing position II in which such flow between the two chambers is prevented. The bypass valve 64 is movable between the two positions thereof by an electromagnet 65 connected thereto. A conduit 67 is connected to the conduit 57 between the reversing valve 27 and the multiple position valve 52 and the conduit 67 leads to a pressure switch 66.

If the vehicle, on which the hydraulic steering arrangement described above is provided, should be manually steered, then the reversing valve 27 is moved, by the electromagnet 58 connected thereto, to the position I, so that the pressure fluid furnished by the pump 20 flows over the conduits 24, 59 and the multiple position valve 12, and when the latter is brought by the steering wheel 10 to one of its working positions, to the servo device 15. Depending on the turning of the steering wheel 10, the piston 17 of the servo device 15 will be moved thereby in the one or the other direction, so that the position of the wheel 42 is adjusted over the linkage 39 in a corresponding manner.

If the hydraulic steering arrangement is to be automatically controlled, so that the vehicle may move for instance along a guide rail, then the reversing valve 27 is brought to the position II, as illustrated in the drawing. In this position pressure fluid flows from the feed conduit 24 over the reversing valve 27 into the conduit 57 and over the multiple position valve 52, when the latter is brought into one of its working positions I or III to the pressure chamber 47 or 48 of the working cylinder 45. The positions of the valve 52 are controlled by the electromagnets 53 and 54, which in turn may be controlled over sensors and an electronic control device of known construction, not forming part of the present invention and not illustrated in the drawing. Since the position of the wheel 42 is now determined by the position of the piston 44 in the working cylinder 45, the piston 17 of the servo device 15 must be freely movable in the cylinder 16, that is it must be taken along by the linkage 39. This is possible my moving the bypass valve 64, by the electromagnet 65 connected thereto, to the throughflow position I, in which the two pressure chambers 18 and 19 to opposite sides of the piston 17 are connected with each other.

Since the volumes of the two pressure chambers 47 and 48 in the working cylinder 45 are different, it is necessary, during manual operation of the steering arrangement in which the piston 44 has to be carried along, to provide a volume equalization between the two aforementioned pressure chambers. This is accomplished by moving the valve 52 to its neutral position II in which all ports of the valve 52 are connected with each other. This neutral position is a so-called floating position in which a connection between the two pressure chambers 47, 48 and the tank 22 is established. This floating position is provided when the automatic operation of the hydraulic steering arrangement is switched off and the reversing valve 27 is in its position I, that is when the vehicle is steered by a hand. It is also essential that a small overpressure prevails in the return conduit 29, which can for instance be accomplished by arranging the tank at a higher lever than the return conduit 29 (which for simplification reason is not shown in the drawing) or by an additional pump or a pressure accumulator, not shown in the drawing.

The pressure to be maintained in the return conduit 29 should be greater than the gas liberation pressure of the liquid pressure medium. The term "gas liberation pressure" is to be understood as the pressure at which gas disolved in the liquid pressure medium, for instance oil, becomes disassociated therefrom. It is also advantageous to construct the return conduit 29 with a low flow resistance. If an underpressure would prevail in the return conduit 29 gas enrichment of the liquid pressure medium would occur, which would lead to disturbance of the steering function.

If the pressure in the conduit 57 falls below a predetermined minimum pressure, the pressure switch 66 interrupts supply of electric current to the valve 52, so that an automatic operation is only possible if a predetermined minimum pressure prevails in the conduit 57.

If for any reason whatsoever the pump 20 should be out of operation, so that the pressure in the feed conduit 24 will drop, the auxiliary pump 30 is automatically put in operation by starting the electric drive motor thereof by means of the pressure switch 34.

At a power failure, the reversing valve 27 connects the pump 20 for safety reasons again with the servo steering, whereby the bypass valve 64 is brought in its position II. The pump 20 furnishes a substantially constant amount of pressure fluid.

It will be understood that each of the elements described above, or two or more together, may also find a useful application in other types of hydraulic steering arrangements differing from the types described above.

While the invention has been illustrated and described as embodied in a hydraulic steering arrangement for the wheels of a vehicle in which the steering arrangement may be manually or automatically controlled, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A hydraulic steering arrangement for the wheels of a vehicle to be manually or automatically controlled, comprising linkage means connected to the wheels of the vehicle; a source of pressure fluid; manually operable means comprising a first multiple position valve adapted to be connected in circuit with said source, said first multiple position valve being movable between a neutral position and two working positions, hydraulically operated servo means in circuit with said first multiple position valve and mechanically connected to said linkage means for controlling the position of the latter, and a manually operable steering wheel connected to said first multiple position valve for moving the same between the positions thereof to thereby control movement of said servo means; automatically operable means comprising a second multiple position valve adapted to be connected in circuit with said source of pressure fluid, said second multiple position valve being movable between a neutral position and two working positions, hydraulically operated cylinder-and-piston means in circuit with said second multiple position valve and also mechanically connected to said linkage means; and a reversing valve connected upstream of said first and said second multiple position valve to said source of pressure fluid and movable between a first position connecting said first multiple position valve to said source of pressure fluid and a second position connecting said second multiple position valve to said source.

2. A hydraulic steering arrangement as defined in claim 1, wherein said source of pressure fluid comprises a tank containing a liquid and a pump in circuit with said reversing valve sucking liquid from said tank and discharging the liquid under pressure, and including a feed conduit between said pump and said reversing valve, and a return conduit connected to each of said multiple position valves and leading back to said tank.

3. A hydraulic steering arrangement as defined in claim 2, wherein said second multiple position valve has a pair of first ports respectively connected to said feed conduit and said return conduit and a pair of second ports and including a pair of conduits respectively connecting said second ports with opposite ends of the cylinder of said cylinder-and-piston means, and wherein in said neutral position of said second multiple position valve all of said ports are connected with each other.

4. A hydraulic steering arrangement as defined in claim 2, wherein in said return conduit a pressure higher than the gas liberation pressure of the liquid used is maintained.

5. A hydraulic steering arrangement as defined in claim 1, wherein said hydraulically operated servo means comprises a cylinder having opposite closed ends, a piston having opposite ends, said piston being axially movable in said cylinder and defining between the opposite ends thereof and said opposite closed ends of said cylinder a pair of pressure chambers respectively connected to said first multiple position valve, and including a bypass valve for connecting said pressure chambers with each other during automatic control of the wheels of the vehicle.

6. A hydraulic steering arrangement as defined in claim 1, wherein said second multiple position valve is an electromagnetically operated four-port, three-position valve.

7. A hydraulic steering arrangement as defined in claim 1, wherein said reversing valve is a four-port, two-position valve.

8. A hydraulic steering arrangement as defined in claim 5, wherein said reversing valve, said second multiple position valve and said bypass valve are electromagnetically operated.

9. A hydraulic steering arrangement as defined in claim 6, and including a hydraulically operated pressure switch arranged in said feed conduit upstream of said second multiple position valve for interrupting current supply to the latter upon decrease of the pressure in the feed conduit below a predetermined minimum pressure.

10. A hydraulic steering arrangement as defined in claim 2, and including an auxiliary pump connected to said feed conduit, an electric motor driving said auxiliary pump, and a pressure switch communicating with said feed conduit and connected to said electric motor for actuating the latter when the pressure in said feed conduit drops below a predetermined minimum pressure.

11. A hydraulic steering arrangement as defined in claim 10, and including a one-way valve between said auxiliary pump and said feed conduit and arranged to permit flow of pressure fluid from said auxiliary pump to said feed conduit, while preventing flow in the opposite direction.

12. A hydraulic steering arrangement as defined in claim 5, wherein said piston is provided on one side thereof with a rack extending in the axial direction of said piston and including a lever tiltable about a fixed axis and carrying at one end thereof a tooth segment meshing with said rack, said lever being connected at the other end to said linkage means.

* * * * *